US010442381B1

(12) United States Patent
Bundy et al.

(10) Patent No.: US 10,442,381 B1
(45) Date of Patent: Oct. 15, 2019

(54) REAR BUMPER STEP FOR A MOTOR VEHICLE

(71) Applicant: Iron Cross Automotive, Inc., Tulsa, OK (US)

(72) Inventors: Troy D. Bundy, Tulsa, OK (US); Don Bundy, Tulsa, OK (US); Eric Long, Broken Arrow, OK (US); Cole Stevens, Sand Springs, OK (US)

(73) Assignee: Iron Cross Automotive, Inc., Tulsa, OK (US)

( * ) Notice: Subject to any disclaimer, the term of this patent is extended or adjusted under 35 U.S.C. 154(b) by 0 days.

(21) Appl. No.: 15/963,487

(22) Filed: Apr. 26, 2018

Related U.S. Application Data

(60) Provisional application No. 62/490,308, filed on Apr. 26, 2017.

(51) Int. Cl.
   *B60R 19/48* (2006.01)
   *B60R 3/00* (2006.01)
   *B62J 15/00* (2006.01)

(52) U.S. Cl.
   CPC ............ *B60R 19/48* (2013.01); *B60R 3/00* (2013.01); *B62J 15/00* (2013.01)

(58) Field of Classification Search
   CPC ............ B60R 3/002; B60R 3/02; B60R 19/48
   USPC ...................... 280/163, 164.1, 166
   See application file for complete search history.

(56) References Cited

U.S. PATENT DOCUMENTS

| 3,171,671 | A | * | 3/1965 | Cornett | .................... B60R 3/00 182/91 |
| 4,121,691 | A | * | 10/1978 | Poplawski | ................ B60R 3/00 182/90 |
| 4,324,412 | A | * | 4/1982 | Wulff | ........................ B60R 3/00 182/90 |
| 4,569,533 | A | * | 2/1986 | Gronert | ..................... B60R 3/00 105/443 |
| 4,750,753 | A | * | 6/1988 | Dezern | ..................... B60R 3/02 224/497 |
| 4,785,910 | A | * | 11/1988 | Tonkovich | .............. B60R 3/007 182/61 |
| 5,458,353 | A | * | 10/1995 | Hanemaayer | ............. B60P 3/36 280/164.1 |
| 5,538,265 | A | * | 7/1996 | Chen | ........................ B60R 3/02 280/163 |
| 5,566,962 | A | * | 10/1996 | Burnham | .................. B60R 3/00 182/127 |

(Continued)

*Primary Examiner* — Jeffrey J Restifo
(74) *Attorney, Agent, or Firm* — GableGotwals

(57) ABSTRACT

Embodiments of a motor vehicle bumper step include a step housing connectable to a bottommost end of a rear bumper. The uppermost end of the housing may include a planar plate containing a curved perimeter portion and, above the planar plate, a bracket including mounting holes. A recessed portion of the housing defines an opening at least partly along two different sides of the housing, with a bottom end of the recessed portion containing a planar step having a curved outward-facing perimeter. A first and a second facia portion each located on a different side of the housing are spaced apart from one another by the recess. The facia portions extend downward from the uppermost end of the step housing and connect to a respective side of the planar step. The step housing may match the bumper profile and not extend past the bumper in a horizontal direction.

19 Claims, 3 Drawing Sheets

(56) References Cited

U.S. PATENT DOCUMENTS

| | | | |
|---|---|---|---|
| 6,168,176 B1* | 1/2001 | Mueller | B60R 3/02 |
| | | | 182/88 |
| 7,293,788 B1* | 11/2007 | Bosley | B60R 3/007 |
| | | | 280/163 |
| 7,416,232 B2* | 8/2008 | Tier | B60R 3/00 |
| | | | 280/163 |
| 7,699,328 B2 | 4/2010 | Crawford | |
| 7,703,784 B2* | 4/2010 | Plavetich | B60R 3/02 |
| | | | 280/164.1 |
| 7,740,261 B2* | 6/2010 | Leitner | B60R 3/02 |
| | | | 280/163 |
| 7,909,344 B1 | 3/2011 | Bundy | |
| 7,946,604 B2 | 5/2011 | Crandall | |
| 8,152,187 B1 | 4/2012 | Crandall | |
| 9,126,535 B1* | 9/2015 | Moore | B60R 3/00 |
| 9,346,404 B1 | 5/2016 | Bundy | |
| 9,434,317 B2* | 9/2016 | Nania | B60R 19/48 |
| 9,511,716 B2 | 12/2016 | Montoya | |
| 9,758,104 B2 | 9/2017 | Fichter | |

\* cited by examiner

REAR BUMPER STEP FOR A MOTOR VEHICLE

CROSS-REFERENCE APPLICATIONS

This application claims priority to U.S. Provisional Patent Application No. 62/490,308, filed Apr. 26, 2017, which is incorporated herein by reference.

BACKGROUND

This disclosure relates to steps connected to a motor vehicle bumper or the bumper's mounting structure. More particularly, the disclosure relates to steps attached to the rear bumper or its mounting hardware so that the step is located below the rear bumper.

SUMMARY

Embodiments of a motor vehicle bumper step of this disclosure include a step housing that is connectable to a bottommost end of a rear bumper of a motor vehicle. The uppermost end of the housing may include a planar plate containing a curved perimeter portion and, above the planar plate, a bracket including mounting holes. A recessed portion of the housing defines an opening at least partly along two different sides of the housing, with a bottom end of the recessed portion. The opening contains a planar step having a curved outward-facing perimeter. A first and a second facia portion may be each located on a different side of the housing and spaced apart from one another by the recess. The facia portions may extend downward from the uppermost end of the step housing and connect to a respective side of the planar step. The step housing may match the bumper profile and not extend past the bumper in a horizontal direction.

ELEMENTS AND NUMBERING USED IN THE DRAWINGS AND DETAILED DESCRIPTION

Figure 1:
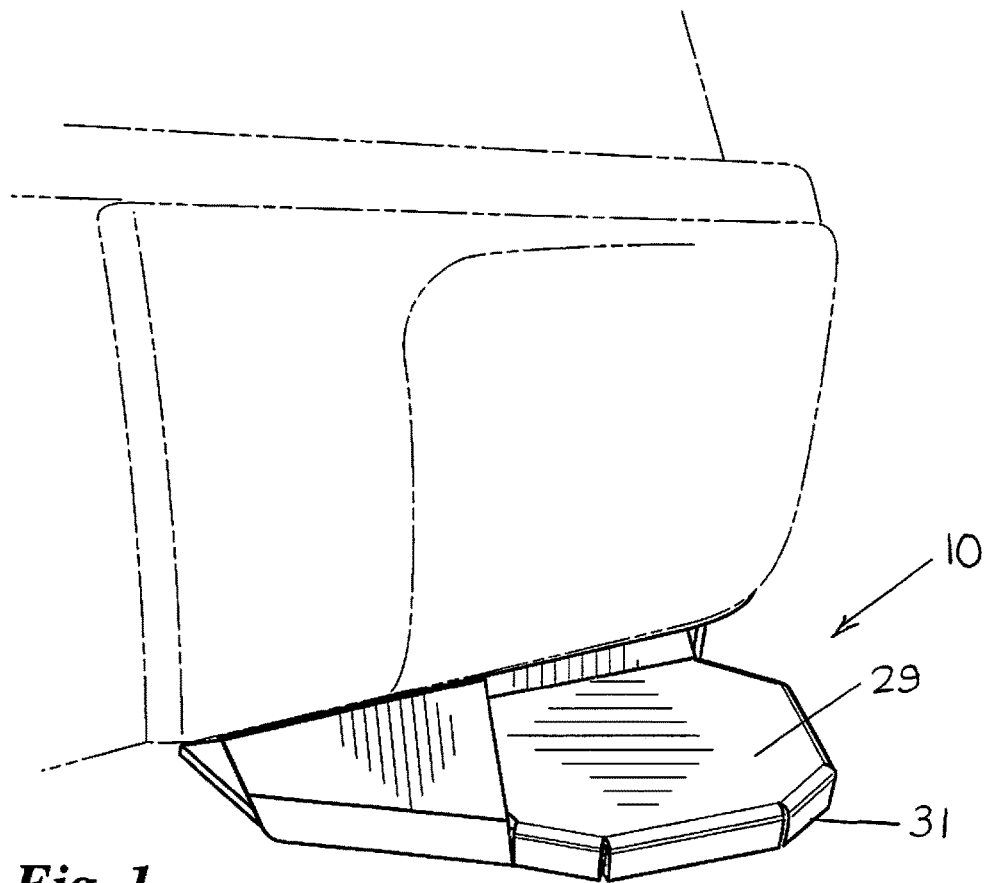
FIG. 1 is an isometric view of an embodiment of a bumper step when connected to a rear bumper using the bumper's or motor vehicle's existing mounting holes or structure.
Figure 2:
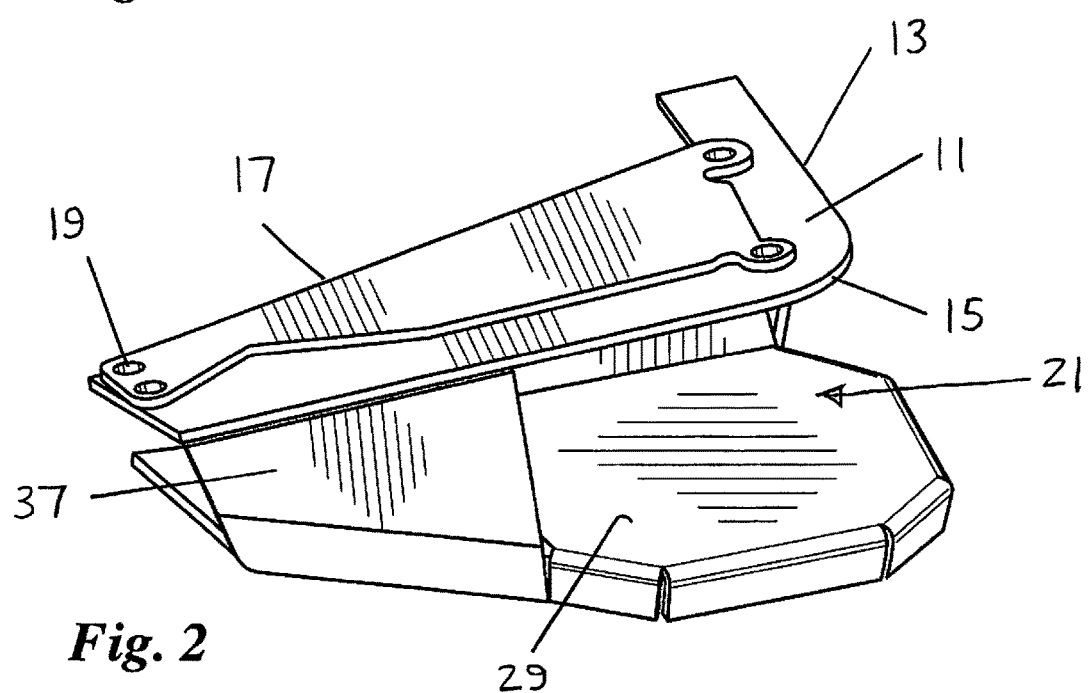
FIG. 2 is side isometric view of the bumper step of FIG. 1.
Figure 3:
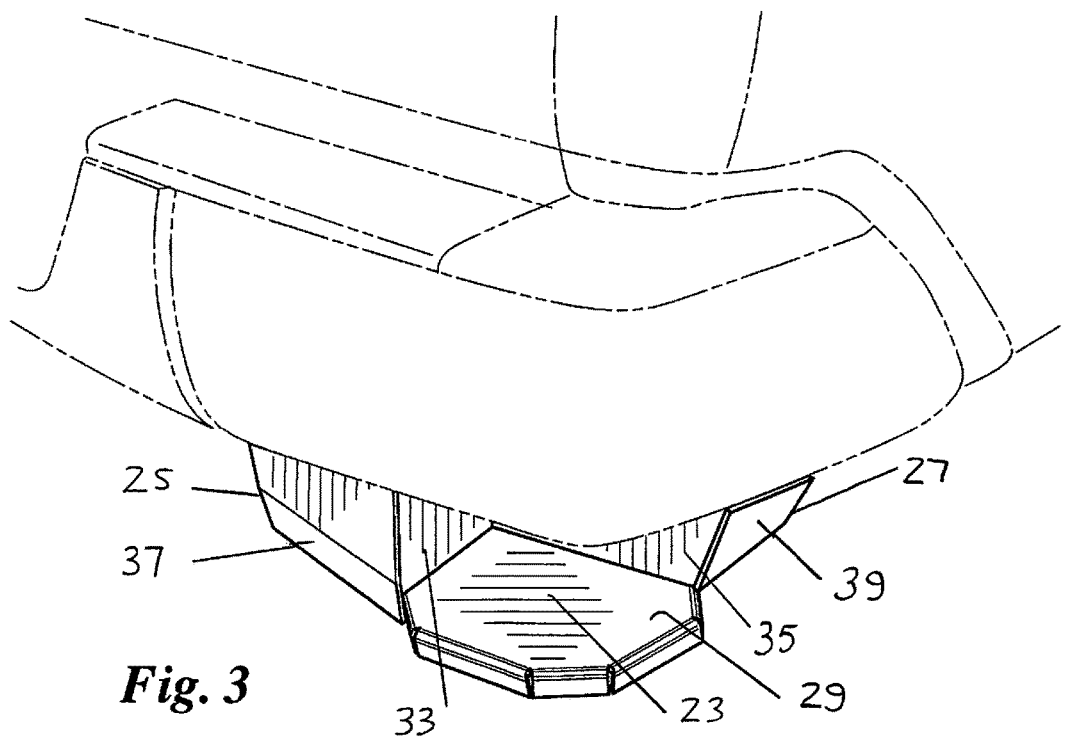
FIG. 3 is another isometric view of the bumper step of FIG. 1. The step, when connected to the rear bumper, does not extend outward past the bumper.
Figure 4:
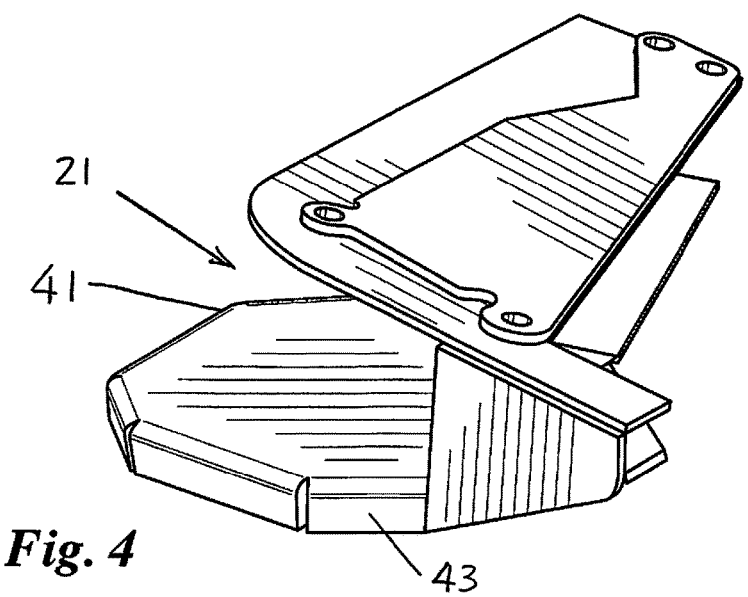
FIG. 4 is another side isometric view of the bumper step of FIG. 1.
Figure 5:
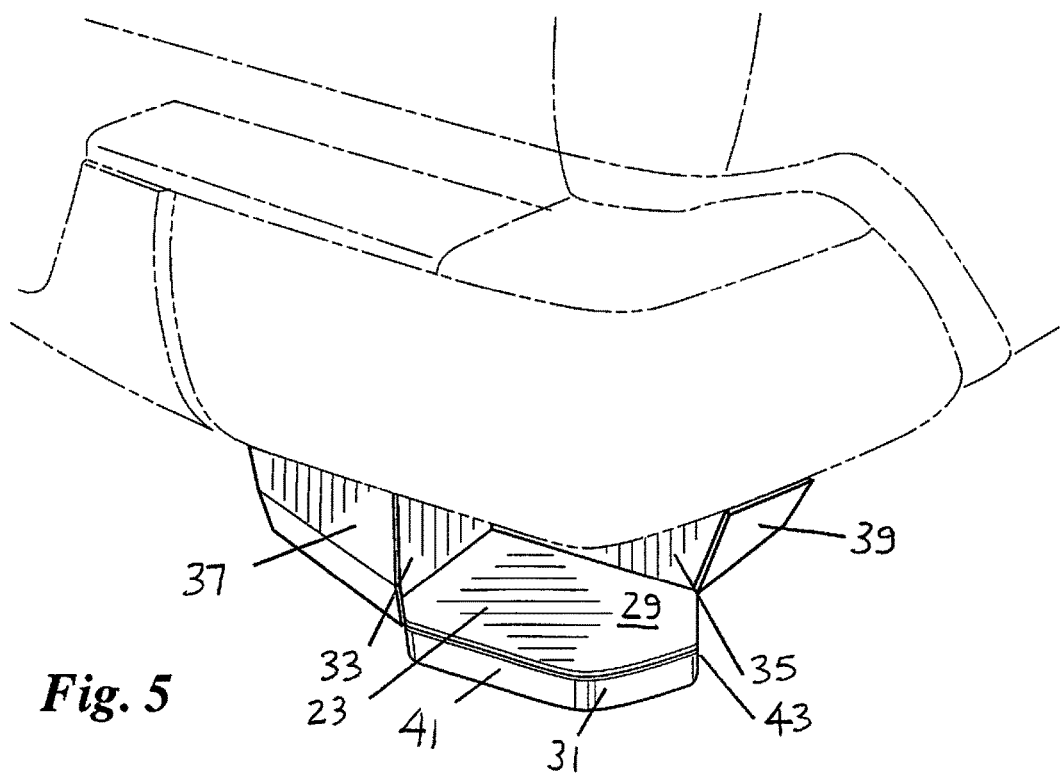
FIG. 5 is an isometric view of another embodiment of a bumper step.
Figure 6:
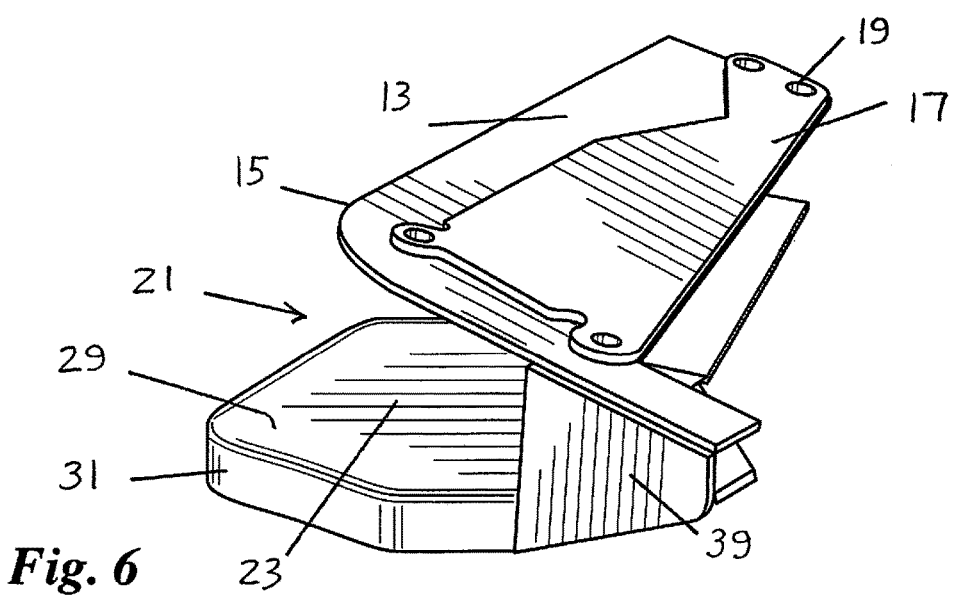
FIG. 6 is a side isometric view of the bumper step of FIG. 5.

10 Step housing
11 Uppermost end 11
13 Planar plate
15 Curved perimeter
17 Bracket
19 Mounting holes
21 Recess
23 Opening
25 Side of 10
27 Side of 10
29 Planar step
31 Curved outward-facing perimeter
33 Sidewall
35 Rear wall
37 First facia portion
39 Second facia portion
41 Side of 29
43 Side of 29

DETAILED DESCRIPTION

Embodiments of a bumper step mount to the rear bumper (or its mounting structure) to provides a step below the rear bumper that does not extend outward past the bumper. In some embodiments, the bumper step includes a housing with a mounting bracket located at an upper end of the housing and a recess located toward its lower end (and below the mounting bracket). The step is not an integral part of the bumper, meaning that it is not formed as part of the bumper, but rather connects to the bumper. The recess provides access to, and forms, the step. The recess may have an open top end opposite the bottom end which forms the step, and may be exposed or partially exposed on the outward facing side of the housing. A side and rear wall of the housing may form the inside wall and rear wall of the recess (and therefore define the step depth).

The housing's exterior profile, when mounted, does not extend past that of the rear bumper. In some embodiments, an outward facing lower edge of the housing may located inward of the rear bumper. Because the recess provides a step within an interior of the housing, the step also does not extend past the rear bumper. In some embodiments, the housing's exterior profile matches that of the rear bumper. For example, the outward facing lower edge of the housing, the recess, or both may be curved in a same or similar way as that of the rear bumper corners to match those corners. Similarly, the outward facing walls of the housing may have a same or similar shape as the of the rear bumper, making it appear as if the housing is a continuation of the bumper.

Referring to the drawings, in embodiments a step housing 10 includes an uppermost end 11 providing a planar plate 13 with a curved perimeter 15 and, above the planar plate 13, a bracket 17 including mounting holes 19. In some embodiments, the planar plate 13 may include complementary mounting holes to that of the bracket 17 or serve as the bracket 17. The plate 13 and bracket 17 may be arranged so that a flange or lip portion of the bumper may be received between the plate 13 and bracket 17.

A recess 21 defines an opening 23 that lies at least partly along two different sides 25, 27 of the housing 10. For example, the sides 25, 27 may be a front side and a right side of the housing 10 when mounted to a passenger side of a motor vehicle or a left side when mounted to the driver side. The opening 23 contains a planar step 29 having a curved outward-facing perimeter 31. The perimeter 31 provides a rounded corner of the step 29.

A first and a second facia portion 37, 39 are spaced apart from one another by the recess 21 and extend downward from the uppermost end 11 of the step housing 10 to a respective side 41, 43 of the planar step 25. The first facia portion 37 may be located along a front side 25 of the housing 10 and form a front wall; the second facia portion 39 may be located along a side 27 of the housing 10 and form a sidewall. The facia portions 37, 39 may be shaped and finished complementary to the bumper. The recess 21 may include a sidewall 33 extending rearward from the front facia portion 37 and toward a rear wall 35, the rear wall 35 extending between an inner sidewall 33 and the side facia portion 39, which forms an outer sidewall.

The embodiments have been described with reference to particular means, materials and embodiments. This description is not intended to limit the disclosure to these particulars. Rather, it extends to all functionally equivalent structures, methods, and uses, such as are within the scope of the following claims.

What is claimed:

1. A motor vehicle bumper step comprising:
    a step housing, the step housing including:
        an uppermost end including a planar plate containing a curved perimeter portion and, above the planar plate, a bracket including mounting holes;
        a recess defining an opening at least partly along two different sides of the housing and containing a planar step including a curved outward-facing perimeter portion;
        a first and a second facia portion each located on a different side of the housing and spaced apart from one another by the recess, said facia portions extending downward from the uppermost end of the step housing and connecting to a respective side of the planar step;
        a side wall and a rear wall, the two different sides of the housing being opposite the side and rear walls, respectively.

2. The motor vehicle bumper step of claim 1, one of the two different sides of the step housing being a front side and another of the two different sides running perpendicular to the front side.

3. The motor vehicle bumper step of claim 1, the side and rear walls of the step housing forming, respectively, a side and rear wall of the recess.

4. The motor vehicle bumper step of claim 3, the first facia portion being directly connected to the side wall of the recess, the second facia portion being directly connected to the rear wall of the recess.

5. The motor vehicle bumper step of claim 4, the first facia portion forming a front wall of the step housing, the second facia portion forming a side wall of the step housing.

6. The motor vehicle bumper step of claim 1, the planar plate and the planar step being oriented parallel to one another.

7. The motor vehicle bumper step of claim 1, further comprising a motor vehicle bumper, the step housing being connected by the bracket to the motor vehicle bumper.

8. The motor vehicle bumper step of claim 7, the planar step being located below a lowermost end of the motor vehicle bumper.

9. The motor vehicle bumper step of claim 7, the first and second facia portions and the curved outward-facing perimeter portion of the planar step being shaped complementary to a profile of the motor vehicle bumper.

10. The motor vehicle bumper step of claim 7, the curved outward-facing perimeter portion of the planar step not extending outward past the motor vehicle bumper.

11. The motor vehicle bumper step of claim 1, the mounting holes of the bracket configured for connection to a bottommost end of a motor vehicle bumper.

12. The motor vehicle bumper step of claim 1, the bracket residing on top of the planar plate.

13. A motor vehicle bumper step comprising:
    a step housing, the step housing including:
        an uppermost end including a planar plate containing a curved perimeter portion and, above the planar plate, a bracket including mounting holes, the bracket residing on top of the planar plate;
        a recess defining an opening at least partly along two different sides of the housing and containing a planar step including a curved outward-facing perimeter portion;
        a first and a second facia portion each located on a different side of the housing and spaced apart from one another by the recess, said facia portions extending downward from the uppermost end of the step housing and connecting to a respective side of the planar step.

14. The motor vehicle bumper step of claim 13, one of the two different sides of the step housing being a front side and another of the two different sides running perpendicular to the front side.

15. The motor vehicle bumper step of claim 13, the step housing further comprising a side wall and a rear wall, the two different sides of the step housing being opposite the side and rear walls, respectively.

16. The motor vehicle bumper step of claim 15, the side and rear walls of the step housing forming, respectively, a side and rear wall of the recess.

17. The motor vehicle bumper step of claim 16, the first facia portion being directly connected to the side wall of the recess, the second facia portion being directly connected to the rear wall of the recess.

18. The motor vehicle bumper step of claim 17, the first facia portion forming a front wall of the step housing, the second facia portion forming a side wall of the step housing.

19. A motor vehicle bumper step comprising:
    a step housing, the step housing including:
        an uppermost end including a planar plate containing a curved perimeter portion and, above the planar plate, a bracket including mounting holes, the bracket residing on top of the planar plate;
        a recess defining an opening at least partly along two different sides of the housing and containing a planar step including a curved outward-facing perimeter portion;
        a first and a second facia portion each located on a different side of the housing and spaced apart from one another by the recess, said facia portions extending downward from the uppermost end of the step housing and connecting to a respective side of the planar step;
        a side wall and a rear wall, the two different sides of the housing being opposite the side and rear walls, respectively.

* * * * *